June 15, 1926.
C. C. HANSEN
FLUID PRESSURE OPERATED VALVE
Filed Nov. 5, 1923
1,589,288
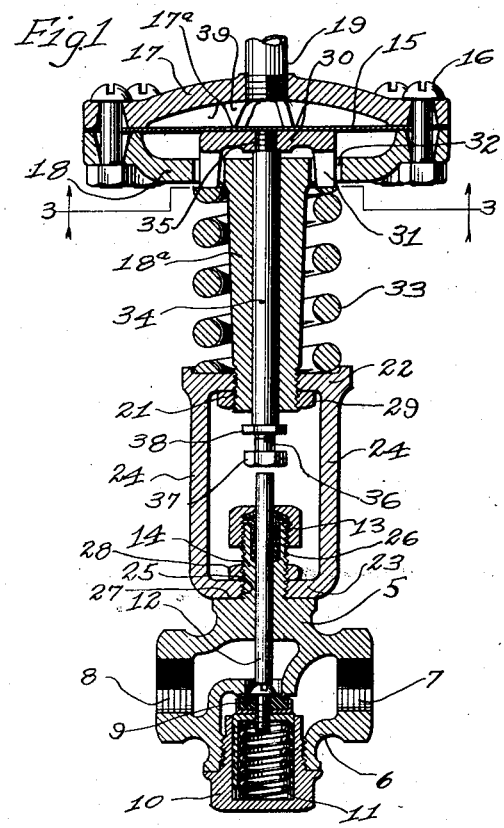
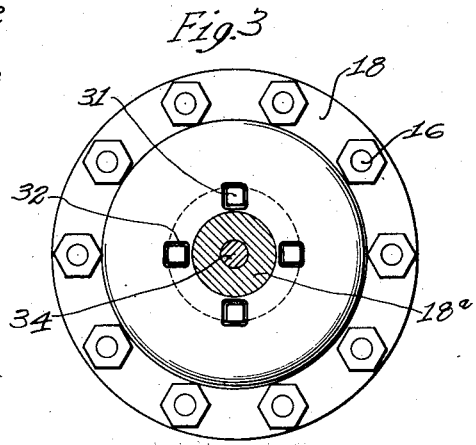
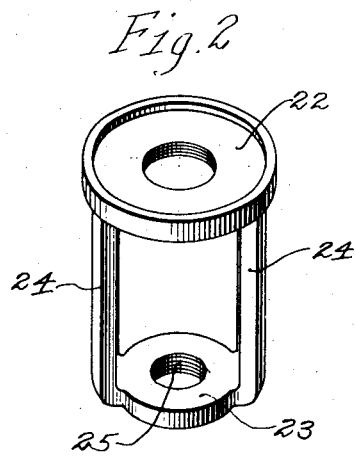
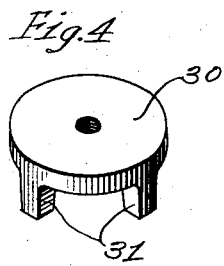
Inventor
Charles C. Hansen
by Fred Gulach
his Atty.

Patented June 15, 1926.

1,589,288

UNITED STATES PATENT OFFICE.

CHARLES C. HANSEN, OF FOREST PARK, ILLINOIS, ASSIGNOR TO REFRIGERATING SPECIALTIES CO., OF CHICAGO, ILLINOIS, A CORPORATION OF ILLINOIS.

FLUID-PRESSURE-OPERATED VALVE.

Application filed November 5, 1923. Serial No. 672,833.

The invention relates to fluid pressure actuated valves and its object is to provide an improved construction which can be readily assembled without the necessity of using extreme care in setting or adjustment in order to insure true alignment of the valve stem and the diaphragm-operated stem, and which is composed of separate units which can be easily and readily assembled and truly correlatively positioned.

The invention consists in the several novel features hereinafter set forth and more particularly defined by claims at the conclusion hereof.

In the drawings: Fig. 1 is a central section of a valve and pressure-controlled actuator embodying the invention. Fig. 2 is a perspective of the actuator supporting frame. Fig. 3 is a section on line 3—3 of Fig. 1. Fig. 4 is a detail perspective of the abutment between the diaphragm and the retraction-spring.

The invention is exemplified in a device for controlling a valve 5 in the condensing water line of a refrigerator system, such valve comprising a casing 6 provided with a water-inlet 7 and a water-outlet 8, a plunger 9 for controlling communication between the inlet and outlet, a plug 10 which is threaded to the casing and in which the plunger slides, a spring 11 contained in the plug and for normally holding plunger 9 closed or against its seat, and a stem 12 fixed to the plunger and extending upwardly through a packing-box 13 which is provided in a nipple or extension 14 integral with the casing 6 to prevent leakage. The stem has a projecting terminal which is adapted to be engaged by the tappet of the actuator to open the valve against the force of spring 11.

The actuator for operating the valve comprises a flexible metal diaphragm 15 the margin of which is clamped by bolts 16 in a casing formed of a chambered-head 17 and a supporting-head or member 18. A pipe 19 connected to the refrigerating line delivers fluid such as ammonia, under pressure, into the diaphragm-chamber 17ª, one side of which is formed by the diaphragm 15, to shift the valve responsively to predetermined pressure-variations of the ammonia in said line. The supporting-head 18 of the actuator is provided with an integral sleeve 18ª which has its lower end provided with an exterior screw-thread 21. An integral open frame is interposed between the valve casing and head 18 to connect them together, and comprises a top 22, a bottom 23, and two standards 24. Bottom 23 is provided with a female screw-thread 25 to fit an exterior screw-thread 26 on the nipple 14 on the valve casing, is adapted to seat on a shoulder 27 on said casing, and is fixed to the casing by a lock nut 28 around nipple 14. Top 22 of this frame is threaded to receive thread 21 on sleeve 18ª and a nut 29 is adapted to lock the supporting-head 18 of the frame.

An abutment on plate 30 engages the exposed face of diaphragm 15 and is provided with lugs 31 which extend through openings 32 in the supporting head. A coil-spring 33 is interposed between the frame-top 22 and lugs 31 to retract the diaphragm 15 and the stem 34 which is screw-threaded at 35 to abutment 30 and extends downwardly through the sleeve 18ª to operate the valve-stem 12. An adjustable tappet for engaging the upper end of the valve-stem consists of a screw 36 threaded into the end of stem 34, with a head 37, which is secured in assigned position by a lock-nut 38. Lugs 39 are formed in head 17 to limit the inward movement of the diaphragm by spring 33.

In operation, the valve will be normally kept closed by spring 11 and the diaphragm 15 will be normally held against lugs 39 by the force of spring 33 applied through abutment 30 which is separate from but bears against the diaphragm for this purpose. When the pressure in the refrigerant or other line connected to the diaphragm casing by pipe 19, rises to or above a predetermined point, it will operate the diaphragm against the force of spring 33 to shift the abutment 30 and stem 34 to cause tappet-screw 36 to operate stem 12 and plunger 9 to open the valve and permit water to flow therethrough to the condenser or other element to be cooled. When the pressure subsides, the spring 33 will retract the abutment and diaphragm, and spring 11 will close the valve.

The invention exemplifies a construction in which the diaphragm-casing is supported by a unitary frame and a sleeve through which the stem of the regulator slides, which can be easily and quickly assembled at the factory, and in which the screw-connection between the frame and sleeve is such as to avoid any disalignment or relative inclination between the valve-stem and the actuator stem, and in which the force of the actuator-spring is applied to the abutment through the supporting-member of the diaphragm casing. The screw-threaded connection between the frame and sleeve 18ª makes it possible to readily adjust the force of the spring 33 to regulate the operation of the actuator for different pressures by mere rotation of the actuator-casing.

The invention is not to be understood as restricted to the details set forth, since these may be modified within the scope of the appended claims, without departing from the spirit and scope of the invention.

I claim:—

1. The combination of a valve comprising an enclosing casing and a valve operating stem movable therein, a fluid pressure actuator comprising a diaphragm and a rigid casing provided with a sleeve, a frame separate from said casings interposed therebetween and provided at its ends with means for detachable connection to the valve casing and said sleeve respectively, said sleeve constituting a support between the frame and the actuator casing, a stem operated by the diaphragm, slidable in the sleeve and for operating the valve stem, and a spring around said sleeve for retracting the actuator stem.

2. The combination of a valve comprising an enclosing casing and a valve operating stem movable therein, a fluid pressure actuator comprising a diaphragm and a rigid casing provided with a sleeve, a frame separate from said casing interposed therebetween and provided at its ends with means for detachable connection to the valve casing and said sleeve respectively, said sleeve constituting a support between the frame and the actuator casing, a stem operated by the diaphragm slidable in the sleeve and for operating the valve stem, one of the detachable frame connections being adjustable, and a spring for retracting the actuator stem, interposed between the frame and said diaphragm, the tension of said spring being variable by said adjustable connection.

3. The combination of a valve comprising an enclosing casing and a valve operating stem movable therein, a fluid pressure actuator comprising a diaphragm and a rigid casing provided with a sleeve, a frame separate from said casing interposed therebetween and provided at its ends with means for detachable connection to the valve casing and said sleeve respectively, said sleeve constituting a support between the frame and actuator casing, a stem operated by the diaphragm slidable in the sleeve and for operating the valve stem, said stems having contiguous unconnected ends, and being removable with the casings in which they are respectively carried, and a spring for retracting the actuator stem.

4. The combination of a valve comprising a casing and a stem movable therein, a fluid-pressure actuator comprising a diaphragm and a casing, a sleeve on the actuator-casing, a frame provided with means for connection to said valve-casing and a screw thread for connection to said sleeve, a lock-nut on said sleeve to secure the sleeve in its assigned position, a stem operated by the diaphragm, slidable in said sleeve and adapted to operate said valve stem, and means slidable outside of the actuator-casing for retracting the actuator-stem.

5. The combination of a valve comprising a casing and a stem movable therein, a fluid-pressure actuator comprising a diaphragm and a casing, a sleeve on the actuator-casing, an open frame provided with means for connection to said valve-casing and to said sleeve, an abutment operable by the diaphragm and in the actuator casing, a stem fixed to said abutment, slidable in said sleeve and adapted to operate said valve-stem, and means outside of the actuator-casing for retracting the abutment.

6. The combination of a valve comprising a casing and a stem movable therein, a fluid-pressure actuator comprising a diaphragm and a casing, a sleeve on the actuator-casing, a frame provided with means for connection to said valve-casing and a screw-thread for adjustable connection with said sleeve, an abutment engaged and operable by the diaphragm, a stem fixed to said abutment, slidable in said sleeve and adapted to operate said valve-stem, and a spring extending around the sleeve and abutting against the frame for retracting the abutment.

7. The combination of a valve comprising a casing and a stem movable therein, a fluid-pressure actuator comprising a diaphragm and a casing, a sleeve on the actuator-casing, an integral open frame provided with means for connection to said valve-casing and a screw-thread for connection with said sleeve, an abutment operable by the diaphragm, a stem fixed to said abutment, slidable in said sleeve and adapted to operate said valve stem, and a spring extending around the sleeve and abutting against the frame for retracting the abutment and actuator-stem.

8. The combination of a valve comprising a casing and a stem movable therein, a fluid-pressure actuator comprising a diaphragm and a casing, a sleeve on the actuator-casing, a frame provided with means for connection to said valve-casing and to said sleeve, an abutment operable by the diaphragm, having lugs extending through said actuator casing, a coil spring between said lugs and said frame, and a stem extending through said sleeve for operating the valve-stem.

9. The combination of a valve comprising a casing and a stem movable therein, a fluid-pressure actuator comprising a diaphragm and a casing, a sleeve on the actuator-casing, an integral frame provided with means for connection to said valve-casing and a screw-thread for adjustable connection with said sleeve, an abutment operable by the diaphragm having lugs extending through said actuator casing, a coil spring between the lugs and said frame and adjustable by the rotation of the actuator-casing, and a stem extending through said sleeve for shifting said valve stem.

10. The combination of a valve comprising a casing and a stem movable therein, a fluid-pressure actuator comprising a diaphragm and a casing, a supporting sleeve for the actuator-casing, an open integral frame provided with means for connection to said valve-casing and a screw-thread for connection to said sleeve, a lock-nut on said sleeve, an abutment operable by the diaphragm having lugs extending through said actuator casing, a coil spring between said lugs and said frame, and a stem extending through said sleeve and fixed to said abutment, and an adjustable toppet in said actuator-stem, to operate the valve-stem.

Signed at Chicago, Illinois this 30th day of August, 1923.

CHARLES C. HANSEN.